(12) United States Patent
Critchlow (10) Patent No.: US 7,117,068 B2
(45) Date of Patent: Oct. 3, 2006

(54) SYSTEM AND METHOD FOR LIBRARY ROBOTICS POSITIONAL ACCURACY USING PARALLAX VIEWING

(75) Inventor: Michael E. Critchlow, Rancho Santa Margarita, CA (US)

(73) Assignee: Quantum Corporation, San Jose, CA (US)

( * ) Notice: Subject to any disclaimer, the term of this patent is extended or adjusted under 35 U.S.C. 154(b) by 185 days.

(21) Appl. No.: 10/676,567

(22) Filed: Sep. 30, 2003

(65) Prior Publication Data

US 2005/0080512 A1    Apr. 14, 2005

Related U.S. Application Data

(60) Provisional application No. 60/507,414, filed on Sep. 29, 2003.

(51) Int. Cl.
*G06F 19/00* (2006.01)

(52) U.S. Cl. ............... 700/245; 700/57; 700/64; 700/215; 700/218; 700/254; 235/383; 235/385; 369/30.31; 369/30.36; 901/46; 901/50; 702/105

(58) Field of Classification Search ........... 700/245, 700/57, 64, 215, 218, 254; 235/383, 385; 369/30.31, 30.36, 92, 69, 71; 702/105; 901/46, 901/50; 414/273, 850; 360/98.04
See application file for complete search history.

(56) References Cited

U.S. PATENT DOCUMENTS

| | | | |
|---|---|---|---|
| 4,908,777 A | 3/1990 | Wolfe | |
| 5,237,468 A * | 8/1993 | Ellis | 360/92 |
| 5,303,034 A | 4/1994 | Carmichael et al. | |
| 5,321,353 A | 6/1994 | Furness | |
| 5,426,581 A | 6/1995 | Kishi et al. | |
| 5,429,470 A | 7/1995 | Nicol et al. | |
| 5,661,287 A * | 8/1997 | Schaefer et al. | 235/383 |
| 5,814,171 A | 9/1998 | Manes et al. | |
| 5,925,119 A | 7/1999 | Maroney | |
| 5,959,425 A | 9/1999 | Bieman et al. | |
| 6,101,455 A | 8/2000 | Davis | |
| 6,213,705 B1 | 4/2001 | Wilson | |
| 6,347,742 B1 | 2/2002 | Winarski et al. | |
| 6,374,145 B1 | 4/2002 | Lignoul | |
| 6,385,003 B1* | 5/2002 | Ellis | 360/92 |
| 6,438,448 B1 | 8/2002 | Manes et al. | |
| 6,574,529 B1 | 6/2003 | Lundeen et al. | |
| 2002/0177924 A1 | 11/2002 | Manes et al. | |
| 2003/0053715 A1 | 3/2003 | Chamberlain | |
| 2003/0137766 A1* | 7/2003 | Ellis et al. | 360/69 |
| 2005/0067490 A1 | 3/2005 | Fletcher | |

OTHER PUBLICATIONS

Kingbright, 3.65×6.15mm Single Chip LED Bars, 2001, Internet, pp. 1-5.*

\* cited by examiner

*Primary Examiner*—Thomas G. Black
*Assistant Examiner*—McDieunel Marc
(74) *Attorney, Agent, or Firm*—Morrison & Foerster LLP (57) ABSTRACT

In one aspect and one example, a method for calibrating robotic picker mechanisms in automated storage library systems includes detecting a calibration mark with at least one sensor from a first position and a second position, where the first position and the second position are separated by an offset distance. Further, the method includes determining a shift in the calibration mark between the first position and the second position, and determining a distance between a reference position and the calibration mark based on the shift in the calibration mark, the offset distance, and the focal length of the sensor.

28 Claims, 7 Drawing Sheets

SYSTEM AND METHOD FOR LIBRARY ROBOTICS POSITIONAL ACCURACY USING PARALLAX VIEWING

CROSS-REFERENCE TO RELATED APPLICATIONS

The present application claims benefit of earlier filed provisional application U.S. Ser. No. 60/507,414, entitled "SYSTEM AND METHOD FOR LIBRARY ROBOTICS POSITIONAL ACCURACY USING PARALLAX VIEWING," filed on Sep. 29, 2003, which is incorporated herein in its entirety by reference as if fully set forth herein.

BACKGROUND OF THE INVENTION

1. Field of the Invention

The present invention relates generally to automated storage libraries for storing and retrieving computer data, and more particularly to systems and methods for improving the positional accuracy of library robotics through the use of parallax viewing techniques.

2. Description of the Related Art

A popular device for the handling and storage of large amounts of information in a data processing system is an automated storage library system, which generally improves the access speed and reliability of data storage libraries containing large amounts of information. Automated storage library systems typically include a plurality of storage media devices, a transport mechanism, and one or more storage media drives in communication with a computer system or network for inputting and outputting desired information to and from the plurality of storage media devices.

Magnetic tape cartridges, for example, have proven to be an efficient and effective medium for data storage in computer systems and storage libraries. Automated tape cartridge libraries generally have a plurality of storage bins or slots for storing tape cartridges, a robotic picker mechanism (often referred to as a "picker"), and one or more tape drives. The robotic picker may be controlled to select a specific storage tape cartridge from the library and transfer the tape cartridge between a storage slot and a tape drive within seconds. The robotic picker typically includes a gripper or hand mechanism positioned on the robotic picker. The robotic picker may position the gripper near a desired tape cartridge such that the gripper may grip the tape cartridge to remove the tape cartridge from the storage bin and transfer the tape cartridge to load the tape cartridge into a tape drive, load port (for adding or removing tapes from the library), or the like.

An automated storage library is typically interfaced to a computer system such as a computer network or the like. The storage library or interfaced computer system may index the location of the tape cartridges and their associated stored data within the storage library for later retrieval of the stored information. When desired, the storage library may be activated to retrieve a desired storage tape and load it into a drive to access the stored information and/or write new information. In large storage libraries multiple tape drives are generally employed to improve access and storage performance by operating in parallel as well as providing back-up drives in case of failure, maintenance, and the like.

As robotic mechanisms move tape cartridges between storage bins and tape drives the positional accuracy of the robotic mechanism in relation to the storage bins and tape drives is desirably maintained to a high degree to reduce the potential for wear and damage to the cartridges, storage bins, and tape drives. For example, inaccurate positioning may cause mating surfaces between storage cartridge, storage bins, and tape drives to rub or collide causing damage to one or more. Additionally, wear and collisions may cause undesirable debris within the automated library housing that may interfere with or degrade, for example, the tape drive operation.

Positional accuracy of the robotic mechanism may be determined with an optical scanner that scans a point of light in x and y directions, e.g., horizontally and vertically, across a target or fiducial mark on a storage bin or drive bezel. If the camera is positioned such that the target falls within the camera's field of vision, the x and y coordinate values may be measured directly. The distance in the z direction, the extension or depth of the target from the camera, however, is not directly measured by the camera. The distance or z coordinate value can be inferred from a combination of other measurable and/or previously known quantities. For example, the distance may be determined by comparing the image or apparent size of the target to the known size of the target.

One problem with conventional optical approaches for determining the distance between a robotic picker mechanism and portion of the library including a calibration mark is that the target size generally must be known. Additionally, if the calibration mark size is only approximately known, e.g., known within a certain variance, the distance measurement suffers in proportion to the variance of the calibration mark size.

Therefore, new methods and systems for determining positional accuracy of a robotic mechanism in an automated storage library are needed. Further, methods and systems for determining positional accuracy with greater accuracy and/or smaller fiducial marks than prior approaches are desired.

BRIEF SUMMARY OF THE INVENTION

One aspect of the present invention includes methods for determining positional accuracy of library robotic picker mechanism using parallax viewing techniques. In one example, a method includes detecting a calibration mark associated with a storage library from a first position and from a second position, where the first position and the second position are separated by a known distance. Further, the method includes determining a shift in the detected calibration mark between the first position and the second position by using at least one sensor, e.g., a camera, and determining a distance between a reference position and the calibration mark based on the apparent shift in the calibration mark, the offset distance of the sensor, and a focal length of the camera.

Another aspect of the present invention includes devices and systems having a gripper mechanism and a sensor adapted to determine positional accuracy of the gripper mechanism. In one example, the system includes a gripper assembly for handling storage devices, a sensor associated with the gripper assembly; and a controller. The controller and sensor are adapted to detect a calibration mark from a first position and detect a calibration mark from a second position. The controller and sensor are further adapted to determine a "perspective" shift in the detected calibration mark from the first position and the second position relative to the sensor, and thereby determine a distance between the gripper assembly and the calibration mark based on the shift in the apparent position of the detected calibration mark, the distance between the first position and the second position (e.g., the viewing positions), and the focal length associated with the sensor.

The present invention and its various embodiments are better understood upon consideration of the detailed description below in conjunction with the accompanying drawings and claims.

DETAILED DESCRIPTION OF THE INVENTION

The following description is presented to enable any person of ordinary skill in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the scope consistent with the appended claims.

In one example, a sensor for positional accuracy of an automated storage library robotics assembly is described. The sensor includes an area scanner such as a Charge Coupled Device (CCD) or Complementary Metal Oxide Semiconductor (CMOS) device to detect a calibration mark or other fiducial associated with a storage bin or drive bezel and position the robotics correctly for a pick or place operation. Increased accuracy of distance measurement between the robotics assembly and storage bin or drive bezel may be determined through parallax viewing methods. For example, multiple two-dimensional images of a calibration mark or fiducial associated with a storage bin or drive bezel may be detected at slightly different sensor positions and a shift in the calibration mark between the two detected positions determined. With knowledge of the difference in sensor positions and the focal length of the sensor, the distance from the sensor to the calibration mark may be determined.

The exemplary parallax viewing methods allow the creation of relatively large virtual calibration marks from smaller actual calibration marks, where a larger virtual calibration mark may increase the accuracy of distance measurements. Further, distances to fiducials of approximate, unknown, or small size may generally be measured with greater accuracy than by single image methods.

Figure 1:
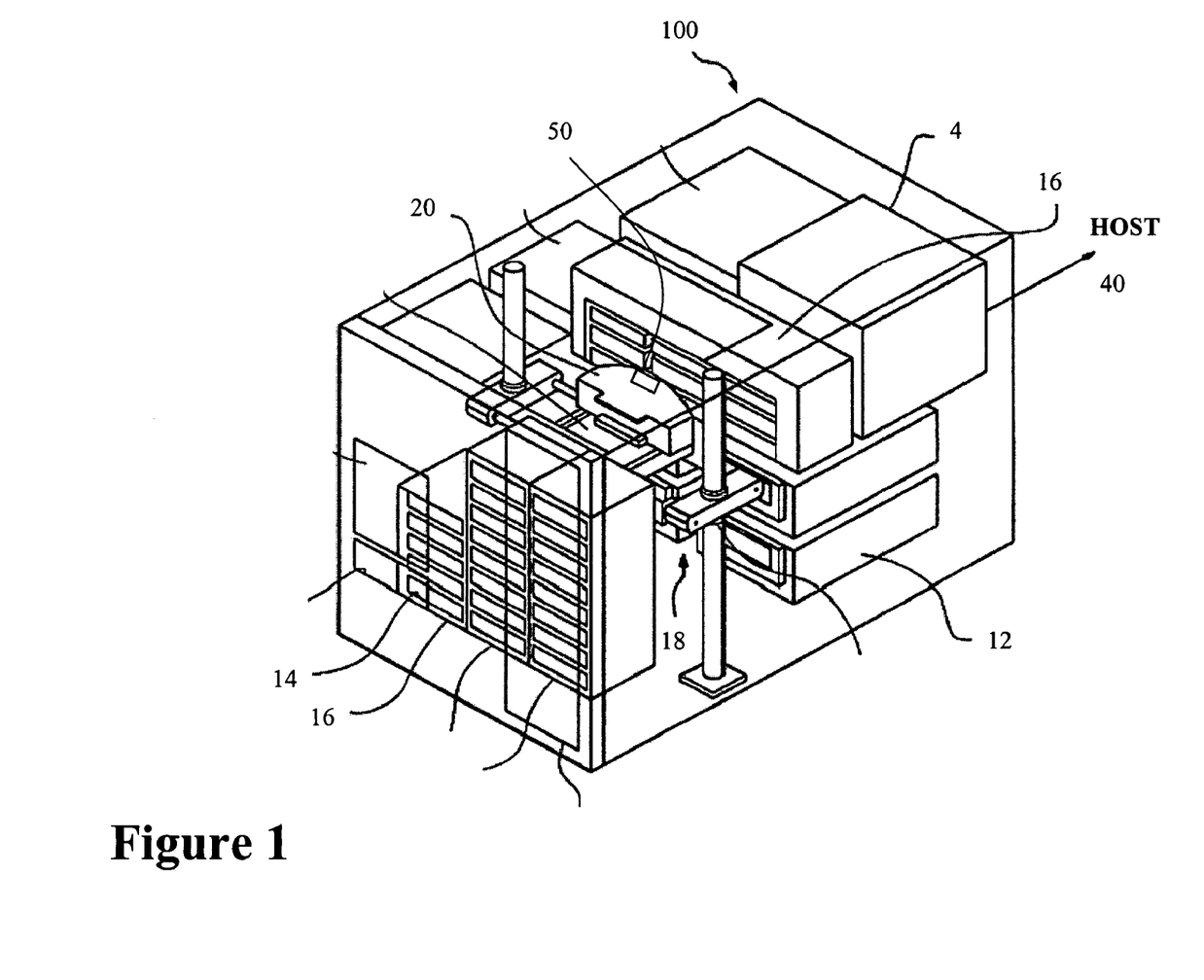
FIG. 1 illustrates an exemplary automated tape library system having a transport mechanism.

FIG. 1 illustrates an exemplary automated storage library system 100 for the storage and retrieval of a plurality of tape cartridges 14. Storage library system 100 may be used with the systems and methods described below with reference to FIGS. 2A–6. The library system 100 is presented merely as an exemplary library system useful with the methods and systems described herein, and various other library systems and configurations may be used. It should also be understood that the various examples are contemplated for use with other types of storage media devices and storage media libraries useful for storing data. For example, a storage library may include various storage devices such as magnetic disks, optical storage devices, and the like alone or in combination with other data storage devices.

Storage library system 100 includes one or more tape drives 12, a plurality of storage cartridges 14 stored in bins or storage slots 16, and a robotic arm 18 equipped with a gripper mechanism 20 for transporting selected cartridges 14. Within automated tape library system 100, robotics, including robotic arm 18 and gripper 20 transport tape cartridges 14 between storage slots 16 and tape drives 12. Tape drives 12 are controlled by library controller 4, which is in communication with a host computer or network system 40. An exemplary drive 12 includes the SDLT™ 320 magnetic tape drive, and an exemplary storage cartridge 14 includes the Super DLTape™ Type I storage cartridge both sold by Quantum Corporation. It should be clear, however, that any type of removable data storage medium and any type of data media drive or data transfer device useful for such a storage medium may be used within storage library 100.

Typically, a calibration process is performed to identify and store relative positions of various features within the library system such that robotic arm 18 may navigate within the library system 100. In particular, positional calibration is performed with storage slots 16 and tape drives 12. In one example, to perform positional calibration, the library system 100 includes a sensor 50 associated with the gripper mechanism 20 that may detect a calibration mark or suitable calibration fiducial mark associated with one or more storage slots 16 and/or tape drives 12. Sensor 50 may detect the calibration mark from at least two different positions and use various parallax viewing methods to determine positional information of gripper mechanisms 20 as described below.

In one example, sensor 50 includes a CMOS or CCD area scanner, but may include any suitable image sensor. For example, other sensors such as a line scanner or mechanical barcode scanner may be used to produce a suitable two-dimensional image. A CMOS area scanner, e.g., may provide greater accuracy and faster movement within the library. Further, a calibration table may be created during use as sensor 50 moves to previously unused positions.

Figure 2A:
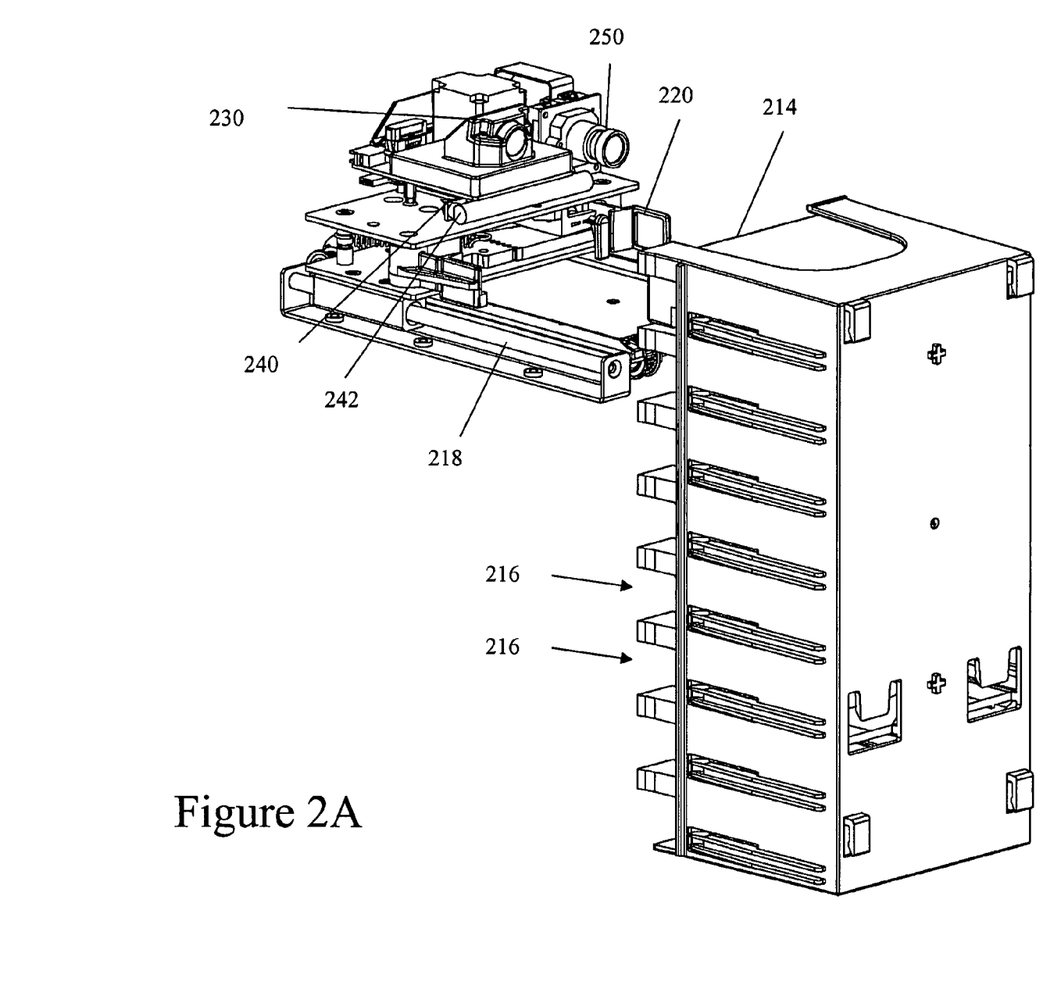
FIGS. 2A and 2B illustrate perspective views of an exemplary gripper assembly and sensor adjacent a column of storage slots.
Figure 2B:
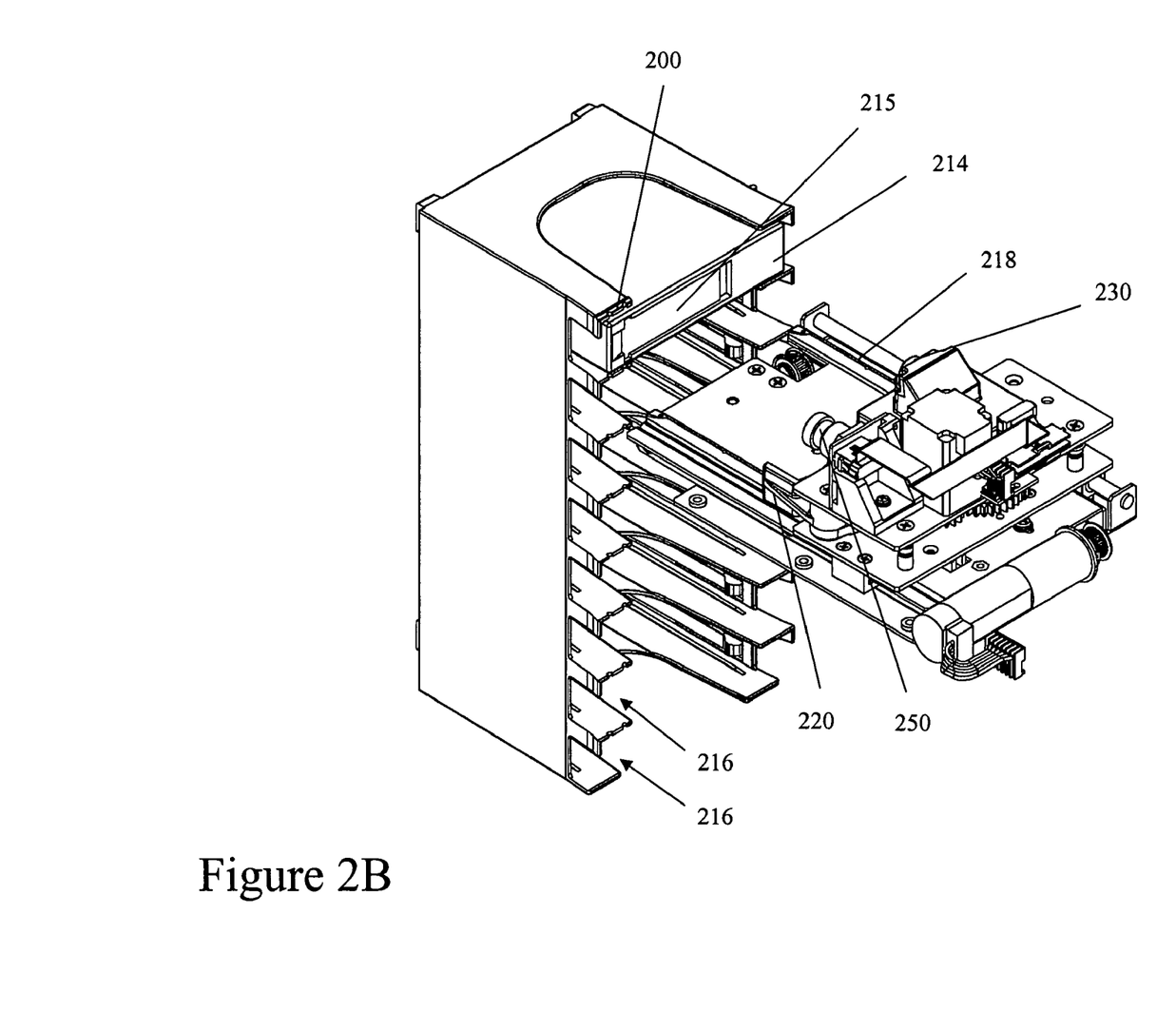

Sensor 50 may be mounted on the gripper mechanism 20 or the robotic arm 18 in any suitable manner. In one example, sensor 50 is located adjacent the gripper mechanism 20 (as shown in FIGS. 2A and 2B) and may be suitably oriented to face the expected position of a calibration mark. Alternatively, the sensor 50 could be located on any convenient location on the gripper mechanism 20 or robotic arm 18.

The library system 100 further includes a library controller 4 for coordinating movements and actions of drives 12, robotic arm 18, gripper mechanism 20, sensor 50, and the like. Library controller 4 may include any suitable computer processor and is typically interconnected with a host processor (not shown), which sends access commands to controller 4. In this manner, information to be recorded or read from one or more of the cartridges 14 is transmitted between one of drives 12 and the host processor, for example, through controller 4 or a separate data path. Library controller 4 may include any programmable general purpose computer or processor and preferably will have a suitably programmed microprocessor or microcontroller. The input-output connections between the library controller and various other components of the library system 100 may include well-known industry standard cabling and communication protocols. For example, Ethernet, Inter Integrated Circuit bus (I2C), Small Computer System Interface (SCSI), ultra-wide SCSI, fast SCSI, fibre channel, and the like.

Library controller 4 operates to coordinate movements and actions of media drives 12, robotic arm 18, and the like. Controller 4 may include a suitable processor as described above and is typically interconnected with a host processor, which sends access commands to controller 4. In one example, information recorded to or read from one or more of the cartridges 14 is transmitted between one of the drives 12 to the host or a storage area network through a second data path connection, e.g., a fibre channel bridge or the like.

Automated tape library system 100 may further include various other features such as a barcode scanner, load ports for manually adding and removing cartridges to and from the library, various access doors, control panels, and the like as are known in the art. For clarity, however, such additional features have been omitted from the description.

FIGS. 2A and 2B illustrate more detailed views of a robotic picker assembly including an exemplary gripper mechanism 220 and sensor 250 adjacent a column of storage slots 216 having a calibration mark 200 thereon (seen in FIG. 2B). The library system may include any number of storage slots 216 arranged in various manners. Typically, multiple columns of storage slots 216 are arranged along an interior cabinet that may be, for example, rectangular or cylindrical in shape. The configuration of storage slots may influence the position and orientation of calibration mark 200. For example, storage slots 216 may be angled down from a front opening to the back to more securely hold cartridges 214 and a calibration mark 200 may therefore face or be detectable from a similar angle as the slots. A calibration mark 200 may be associated with one or more storage slots 216, e.g., a single calibration mark 200 may be used to calibrate for a group or pack of adjacent storage slots 216.

Calibration mark 200 may include any suitable target shape such as a rectangle, cross-hair, or other fiducial mark as illustrated in FIGS. 4A–4F as 450a through 450e. Calibration mark 200 may further include a raised portion, sunken portion, coplanar or otherwise formed features. Alternatively, sensor 250 may use a feature of a storage bin or drive bezel that is suitable to image with sensor 250, i.e., a specific calibration mark dedicated for calibration/positional purposes is not necessary. Thus, calibration mark 200 may include any fiducial element capable of providing a positional reference, e.g., an intentional mark such as a cross or merely a functional element associated with a drive, storage bin, or the like. Additionally, an unintentional mark may also be used.

In operation, light source 240 provides illumination and sensor 250 is oriented towards the expected position of target 200. In some examples light source 240 may be optional. Additionally, in one example, light source 240 may include an infrared light source in conjunction with a suitable camera that can detect infrared light. Light source 240 may also provide illumination for a barcode sensor 230 or other identifying sensor.

Optics included in camera 250 may create a depth of focus at or near the expected location of calibration mark 200. In one example, the depth of focus is within 1.0 inches of the expected depth of calibration mark 200. In another example, sensor 250 is adapted to include a depth of focus approximately plus/minus 0.5 to 1.0 inches from the expected distance of the calibration mark 200 from sensor 250 during operation. Additionally, an auto-focus camera may be included if the variable focal length is known or can be determined.

Figure 3:
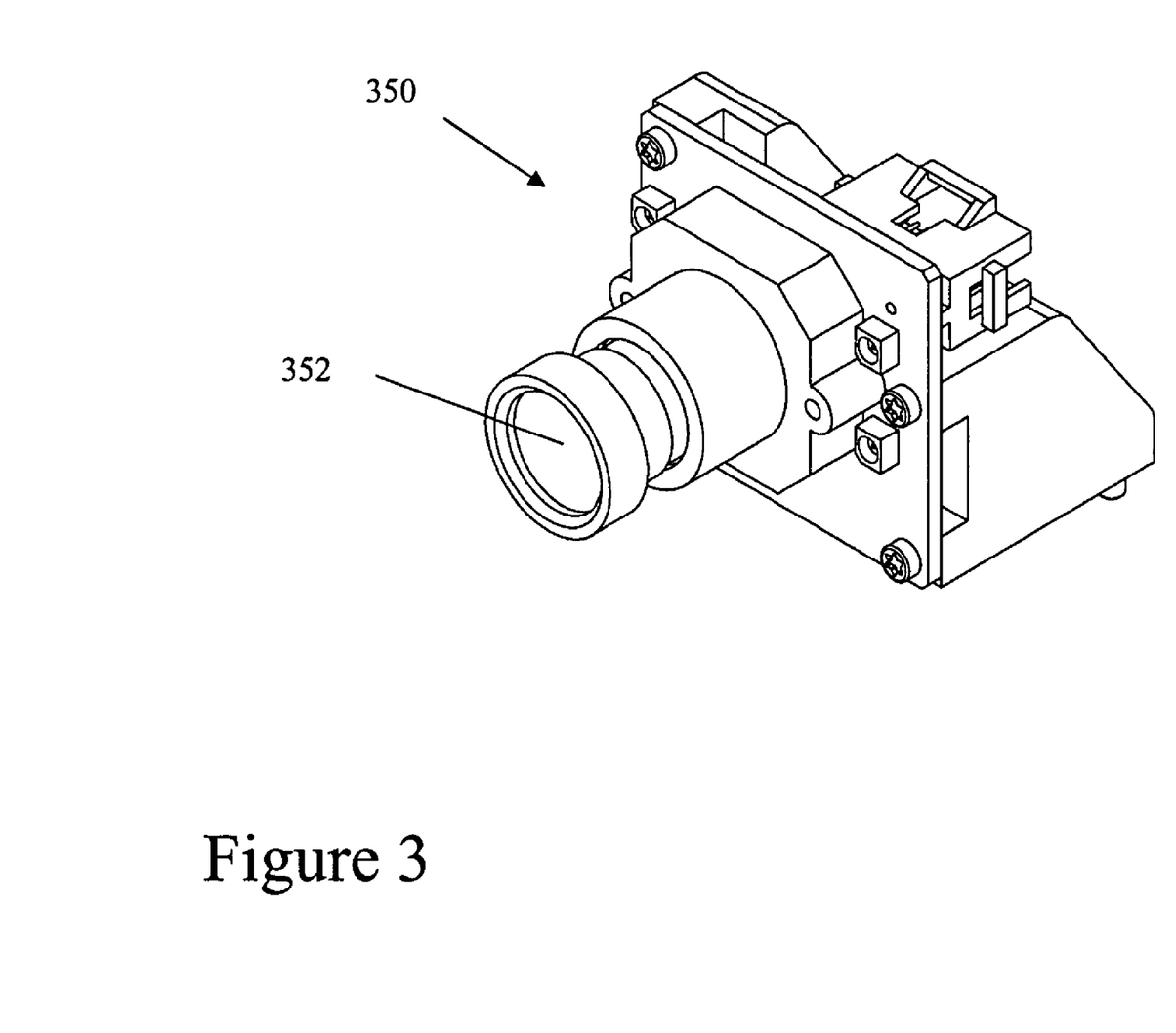
FIG. 3 illustrates an exemplary camera including an area sensor.
Figure 4A:
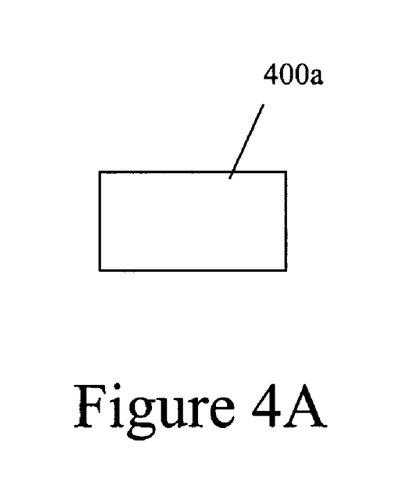
FIGS. 4A–4F illustrate various exemplary fiducial marks or calibration marks.
Figure 4B:
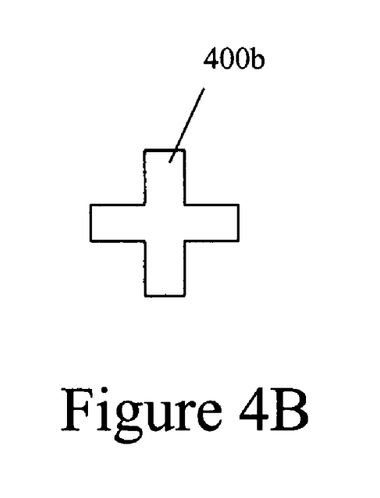
Figure 4C:
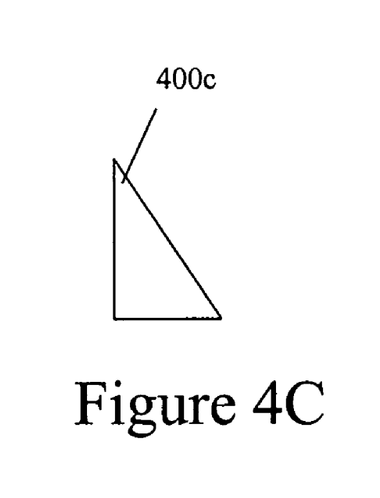
Figure 4D:
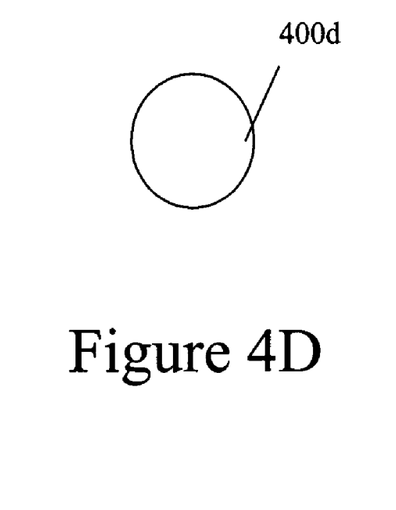
Figure 4E:
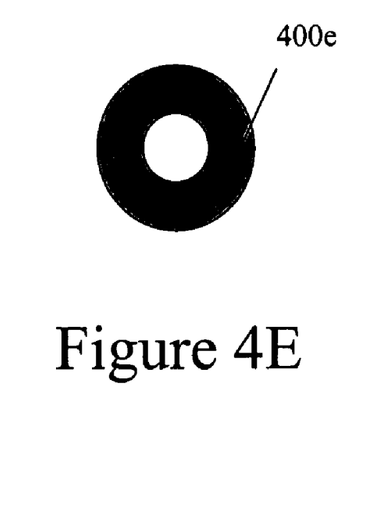
Figure 4F:
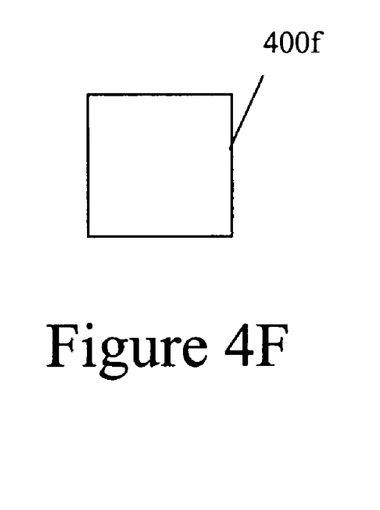

A more detailed view of an exemplary sensor 350 including a lens 352 and imaging device (not shown) for detecting calibration marks and determining robotics positioning accuracy is illustrated in FIG. 3, which may be referred to in conjunction with FIGS. 2A and 2B. Sensor 350 includes a lens 352 to focus and image the calibration mark or fiducial onto a suitable imaging device. In one example, sensor 50 includes a relatively small CCD or CMOS camera subsystem, e.g., a CMOS 640 by 480 pixel array, with a fixed focal length lens 352 mounted upon moveable robotic arm 218 in a tape library system. That is, sensor 350 may travel along with the robotic arm 218 in all its dimensions of freedom. Alternative examples may include, but do not require, a variable focal length lens and/or a separate means of repositioning the camera for parallax viewing. Additionally, multiple sensors may be used to detect calibration mark 200 from different positions or vantage points.

Sensor 350 may further include various mirrors and lenses to project and focus the calibration mark 200 to an area scanner chip depending on the application and design of sensor 350. In this example, a mirror (not shown) is used to redirect the image towards the base of camera 350 where an area scanner is located thereby reducing the profile of sensor 350.

It should be further recognized that the camera 350 and gripper mechanism (see FIG. 2A) may be in various configurations depending on the particular application and design considerations. For example, camera 350 may be located below, horizontally adjacent to, or angled with respect to the gripper mechanism.

Exemplary methods for determining positional accuracy will now be described. A single image method for camera based distance measurements includes comparing an apparent object size (s'), i.e., the dimensions of the calibration or fiducial as detected, to an actual object size (s) of the object, i.e., the actual dimensions of the calibration mark or fiducial, to determine a relative distance (d) from the camera to the object. Given that the focal length (f) of the lens is known, and that the magnification can be measured, i.e., the apparent object size over the actual object size, then using known physical relationships the distance to the object may be calculated mathematically according to the following equations:

$$s'/s = f/x; \text{ and}$$

$$d = f + x = f + f(s/s')$$

where f is the focal length of the camera and x is the additional distance beyond the focal length (such that total distance equals f+x).

In this example, to determine the distance measurement between the sensor and the calibration mark, the actual size of the calibration mark (s) is known. Even in instances where the calibration mark size is approximately known, the distance measurement suffers uncertainty in proportion to the variance of the calibration mark size. Further, the resolution of typical CCD and CMOS camera technology is bounded at some practical limit because the camera includes a grid of individual pixels with a finite size. The result is that the sensitivity of the distance measurement becomes inversely proportional to the size of the calibration mark itself. For example, consider the apparent size of a small point-like fiducial, on the order of the camera pixel dimensions—the perceived size of such a fiducial will not vary greatly over the range of interest because approximately the same number of pixels will be illuminated at varying distances.

Therefore, in one exemplary method for measuring distances where the actual calibration mark size may be unknown or uncertain, a sensor acquires multiple, e.g., two or more, images of a desired calibration mark or fiducial mark from slightly different vantage points or positions in order to create a larger virtual fiducial. The exemplary method may further provide increased accuracy of distance measurements. A calibration mark may include any suitable fiducial such as a line, point, shape, or the like that may be used as a point of reference for the sensor and associated robotic picker mechanism. Preferably, a sensor is slightly offset in the horizontal or vertical direction, orthogonal to the direction between the sensor and the calibration mark. For example, the robot may position itself such that the calibration mark is within the field of view and the horizontal and vertical axes form a plane orthogonal with the sensor's line of sight to the calibration mark. The relative position of the calibration mark to the sensor is detected and the sensor is then moved (e.g., via the robot) to a second, slightly offset, position still within the field of view of the sensor. A second position of the calibration mark is acquired from the new sensor position. The movement of the sensor will result in a shift in the apparent position of the calibration mark location between the two detections that is a direct function of the calibration mark distance and the lens magnification, and because the magnification of the lens may be known or determined, the distance to the calibration mark may be calculated. In one example, the calculations and distances are determined by the library and/or gripper controller through firmware, software, or hardware, alone or in any combination. In other examples, the host may determine the distance measurements.

Figure 5A:
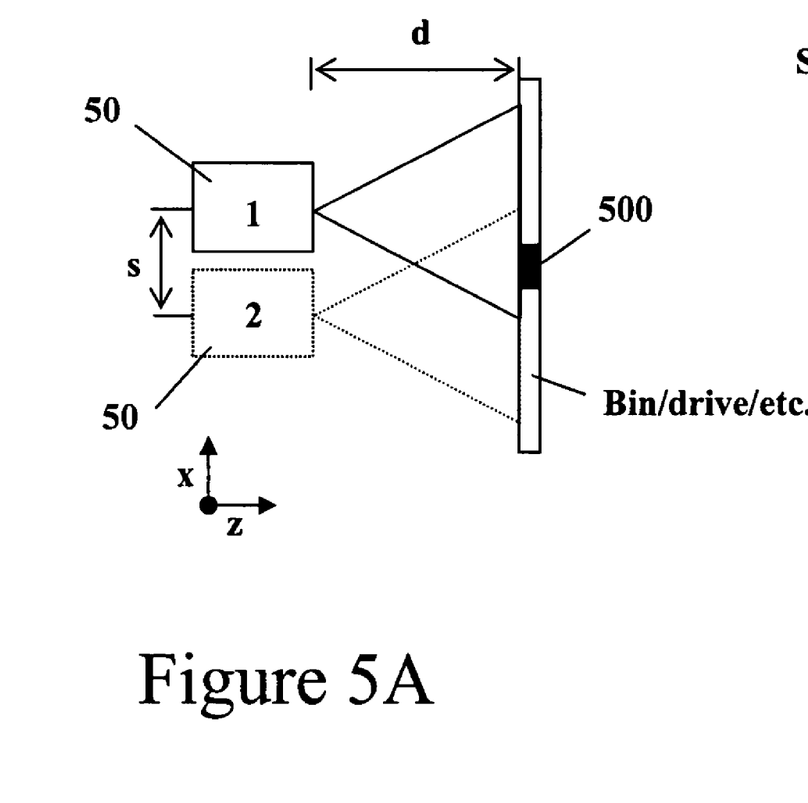
FIGS. 5A and 5B illustrate an exemplary operation of a sensor to determine a distance between a sensor and a calibration mark.
Figure 5B:
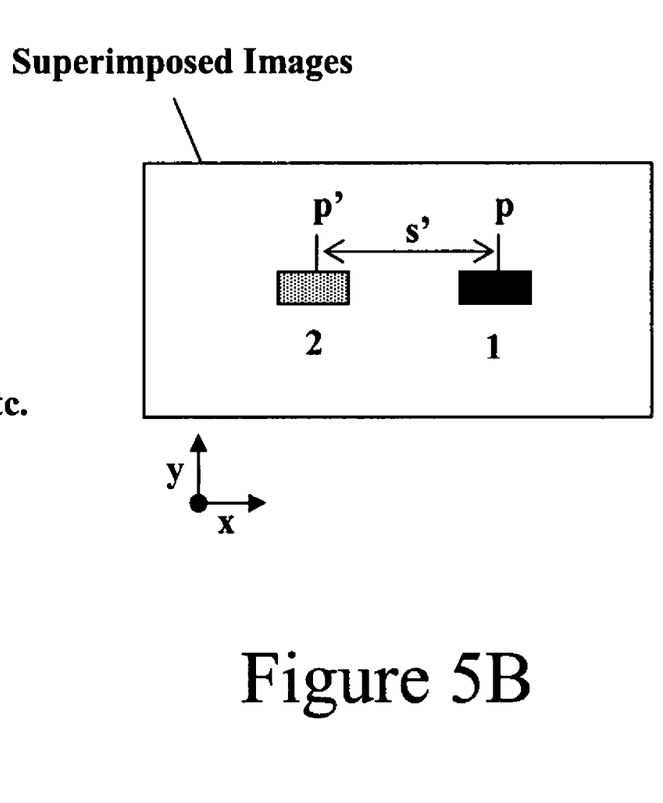

FIGS. 5A and 5B illustrate an exemplary operation of sensor 50 and detected positions of calibration marks 500 relative to sensor 50. Calibration mark 500 may be associated with a storage bin, drive bezel, or the like as shown and may include any suitable fiducial. Sensor 50 detects calibration mark 500 from a first position 1 shown as image 1, and detects calibration mark 500 from a second position 2 (illustrated in dotted lines) shown as image 2, where the first position 1 and second position 2 are offset a distance s. In another example, two separate sensors, e.g., at positions 1 and 2, may detect relative positions of calibration mark 500, e.g., images 1 and 2.

FIG. 5B illustrates the difference between the detected calibration marks 500 detected by sensor 50, where p and p' represent the positions of the fiducial center in the original position 1 and "shifted" position 2 respectively. Preferably, the position of sensor 50 is translated to a second position substantially orthogonal to the distance between sensor 50 and the calibration mark 500. The translation of sensor 50 to the second position will produce a perspective shift in the detection of calibration mark 500. The perspective shift in position, p–p', is similar to the apparent size s' (as described above), and the distance moved by the robot to create the shifted image is similar to s (the actual calibration mark size), which may be known or determined. From this, the distance between sensor 50 and calibration mark 500 may be determined as follows:

$(p-p')/s = f/x$, and $d = f + x = f + fs/(p-p')$ where f equals the focal length of the camera and d is the distance of the average position of the camera. Thereby, the distance between a calibration mark and a reference position, e.g., associated with one or more sensor positions, the gripper mechanism and the like, may be determined.

Figure 6:
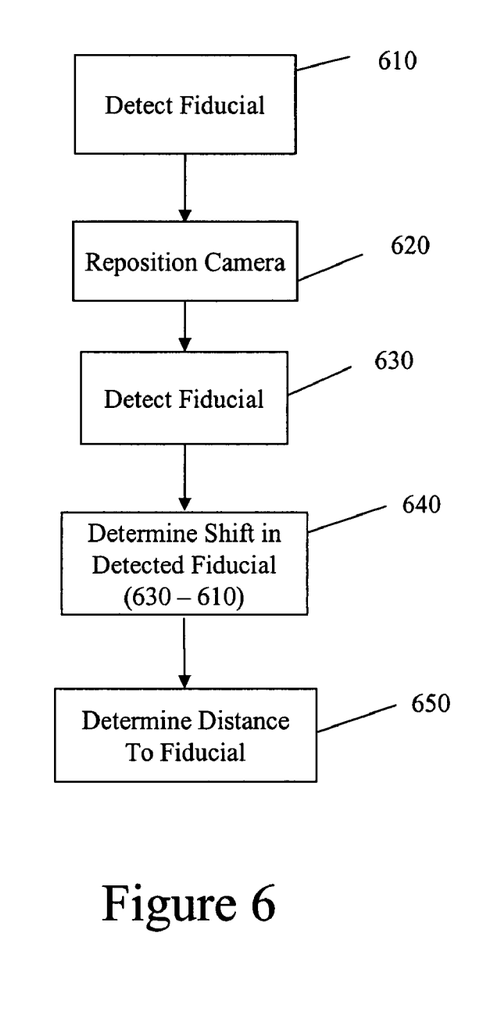
FIG. 6 illustrates an exemplary method for determining a distance between a sensor and a calibration mark.

FIG. 6 illustrates an exemplary method of determining the distance between a sensor and a calibration mark. In block 610, a sensor associated with a robotic mechanism is positioned to detect a calibration mark. The sensor may first search for a calibration mark if necessary, however, generally a system controller will have approximate coordinates of the location of a calibration mark and will position accordingly. When in position, the sensor may detect a relative position of the calibration mark with respect to the sensor in an x and y direction, e.g., horizontal and vertical.

In block 620, the robotic assembly and/or sensor may be repositioned, e.g., translated, to a second position. The distance between the first position and second position may vary depending on the particular application and desired accuracy of the measurements. The calibration mark is then detected from the second position in block 630. Alternatively, the robotic assembly may include two or more sensors that may detect multiple images from different positions with out translating the robotic assembly.

In block 640, the relative shift between the detected calibration mark from the first position and the second position is determined. The calibration mark and shift between the first position and the second position may be analyzed by any suitable methods, e.g., a suitable programmed microcontroller or the like. In one example, the library controller determines the number of pixels between a common feature of the calibration mark to determine the shift between the first position and the second position.

In block 650, the distance between the plane including the two sensor positions and the calibration mark may be determined. In particular, based on the distance between the sensor(s) position when detecting the calibration mark from the first position and the second position, the shift between the calibration mark between the two detections, and the focal length of the sensor, the distance may be determined, e.g., as described above.

It should be understood that the method described with respect to FIG. 6 may be carried out by a controller having a suitable algorithm or program logic. Further, the method indicates certain events or operations occurring in a certain order. In alternative implementations, the order of certain events and operations may be varied, modified, or removed. Moreover, operations and acts may be added to the described method and still conform to the described implementations.

One advantage offered by the exemplary parallax viewing methods includes that the value s, the distance the sensor is offset between detecting the calibration target at a first position and a second position, may be chosen or determined precisely, and does not depend upon a previously known reference value or a real physical fiducial size. In this regard, the quantity (p–p'), the shift the detected position of the calibration target, may be considered to be the size of a virtual fiducial that is created by the movement of the robot and/or sensor. Further, because the sensitivity of the distance measurement is generally proportional to the size of the fiducial, greater accuracy may be obtained by increasing the quantity (p–p'). This may be particularly advantageous for relatively small fiducials, e.g., on the order of the camera pixel size.

Additionally, if the size of the fiducial is not well known or controlled or varies due to manufacturing or optical effects such as the sensitivity adjustment of the sensor, this will impact the accuracy of the result in the single image case. However, the exemplary methods described, including multiple images, may rely on the center point or other common point of the fiducial in each image and not the fiducial size itself. Variations in the actual fiducial size generally do not affect the accuracy of the distance measurement to the extent it might in single image methods. Therefore, the virtual fiducial size remains relatively well known and preferably within the positioning accuracy limits of the robot system.

The above detailed description is provided to illustrate exemplary embodiments and is not intended to be limiting. It will be apparent to those skilled in the art that numerous modification and variations within the scope of the present invention are possible. Accordingly, the present invention is defined by the appended claims and should not be limited by the description herein.

The invention claimed is:

1. A method for calibrating robotic picker mechanisms in automated storage library systems, comprising:
   detecting a calibration mark associated with a storage library with at least one sensor, wherein the at least one sensor detects the calibration mark from a first position and a second position, the first position and the second position separated by an offset distance, wherein the calibration mark comprises an optically detectable indicium;
   determining a relative shift in the detected calibration mark detected from the first position and the second position; and
   determining a distance between the calibration mark and a reference position based on the shift in the detected calibration mark, the offset position, and a focal length associated with the at least one sensor used to detect the calibration mark.

2. The method of claim 1, wherein the reference position is associated with an average position of the first position and the second position.

3. The method of claim 1, wherein the reference position is associated with at least one of the first position and the second position.

4. The method of claim 1, wherein the reference position is associated with a robotic picker mechanism.

5. The method of claim 1, wherein the at least one sensor includes a first sensor and a second sensor.

6. The method of claim 1, wherein the at least one sensor includes a first sensor and a second sensor separated by the offset distance.

7. The method of claim 1, wherein the at least one sensor is associated with a robotic picker mechanism.

8. The method of claim 1, wherein the at least one sensor is attached to a robotic picker mechanism.

9. The method of claim 1, wherein the at least one sensor includes an optical sensor.

10. The method of claim 1, wherein the sensor includes a CMOS imaging device.

11. The method of claim 1, wherein the first position and the second position are in a plane substantially orthogonal to a direction between the at least one sensor and the calibration mark.

12. A robotic mechanism for transporting storage devices in a storage library, comprising:
    a gripper assembly for handling storage devices;
    a sensor associated with the gripper assembly; and
    at least one controller, wherein the at least one controller and sensor are adapted to
    detect a calibration mark from a first position, wherein the calibration mark comprises an optically detectable indicium,
    detect the calibration mark from a second position,
    determine a shift in the detected calibration mark from the first position and the second position relative to the sensor, and
    determine a distance between a reference point and the calibration mark based on the shift in the calibration mark, the distance between the first position and the second position, and a focal length associated with the sensor.

13. The device of claim 12, wherein the reference position is associated with an average position of the first position and the second position.

14. The device of claim 12, wherein the reference position is associated with at least one of the first position and the second position.

15. The device of claim 12, wherein the reference position is associated with the gripper assembly.

16. The device of claim 12, wherein the calibration mark is associated with at least one of a storage bin and a drive bezel.

17. The device of claim 12, further including a light source associated with the gripper assembly for directing light to the approximate position of the calibration mark.

18. The device of claim 12, wherein the sensor is coupled to a robotic picker mechanism.

19. The device of claim 12, wherein the sensor includes an area sensor device.

20. The device of claim 12, wherein the sensor includes a CMOS imaging device.

21. The device of claim 12, wherein the sensor includes a CCD imaging device.

22. The device of claim 12, wherein the calibration mark includes at least one of a rectangular shaped and cross-hair indicium.

23. A storage library system, comprising:
    a housing adapted to include storage slots and one or more media drives; and
    a gripper assembly for handling storage devices in a storage library system, having:
    a sensor associated with the gripper assembly; and
    a controller, wherein the controller and the sensor are configured to:
    detect a calibration mark from a first position, wherein the calibration mark comprises an optically detectable indicium,
    detect a calibration mark from a second position,
    determine a shift in the detected calibration mark from the first position and the second position relative to the sensor, and
    determine a distance between the gripper assembly and the calibration mark based on the shift in the calibration mark, the distance between the first position and the second position, and a focal length associated with the sensor.

24. The system of claim 23, wherein the calibration mark is associated with at least one of a storage bin and a drive bezel.

25. The system of claim 23, further including a light source associated with the gripper assembly for directing light to the approximate position of the calibration mark.

26. The system of claim 23, wherein the sensor includes an area sensor device.

27. The system of claim 23, wherein the sensor includes a CMOS imaging device.

28. The system of claim 23, wherein the sensor includes a CCD imaging device.

* * * * *